Sept. 11, 1945.   C. A. CHERRY   2,384,600
TOOL HOLDER
Filed Sept. 9, 1943   2 Sheets-Sheet 1
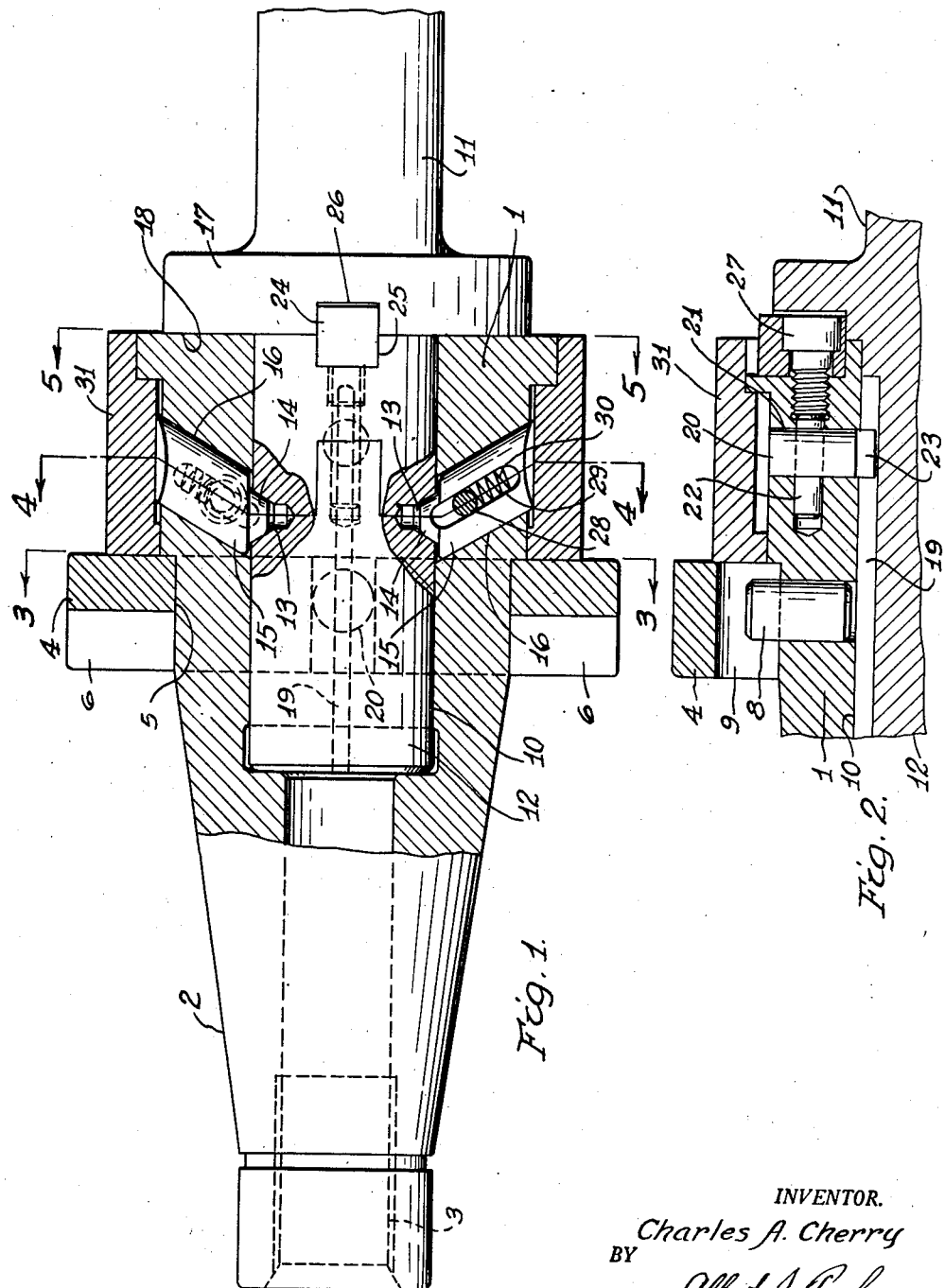
INVENTOR.
Charles A. Cherry
BY
Albert J. Taylor
ATT'Y Sept. 11, 1945.  C. A. CHERRY  2,384,600
TOOL HOLDER
Filed Sept. 9, 1943  2 Sheets-Sheet 2

INVENTOR.
Charles A. Cherry
BY
Albert J. Taylor
ATT'Y

Patented Sept. 11, 1945

2,384,600

UNITED STATES PATENT OFFICE 2,384,600

TOOLHOLDER

Charles A. Cherry, Detroit, Mich., assignor, by mesne assignments, to Beaver Tool & Engineering Corp., Big Beaver, Mich., a corporation of Michigan Application September 9, 1943, Serial No. 501,635

1 Claim. (Cl. 279—81)

This invention relates to improvements in tool holders and adapters. It has to do more particularly with such tools as boring bars, end cutting, side cutting and shear cutting tools. In some respects this invention constitutes an improvement on the invention shown in my prior Patent No. 2,279,899 issued April 14, 1942, to which attention is invited.

The primary object of the present invention is to make it possible to change boring bars, tools and adapters in a matter of but a few seconds and to replace them, when the need requires, in exactly the same position from which they were removed. This feature of the invention is important for the reason that it reduces machine set up time and eliminates the exhaustive checking which is ordinarily necessary when an extremely high degree of precision or accuracy is required as to the size and depth of holes and the relationship between milled faces.

Another object of the invention is to provide a device of the character above described which incorporates a high degree of rigidity as a result of the use of specially designed locking plungers. By means of these locking plungers the tools are held firmly in their correct position, without any possibility of "shake" or vibration, and in such manner that the tools cannot pull out or in any way change their position during the cutting operation. This assures accurate milling and facing operations and reduces the spoilage that would otherwise occur.

With the above and other ends in view, the invention is disclosed more fully with reference to the accompanying drawings, in which Fig. 1 is a side elevation having parts thereof broken away and shown in cross section.

Fig. 2 is a fragmental cross section, and

Figure 3:
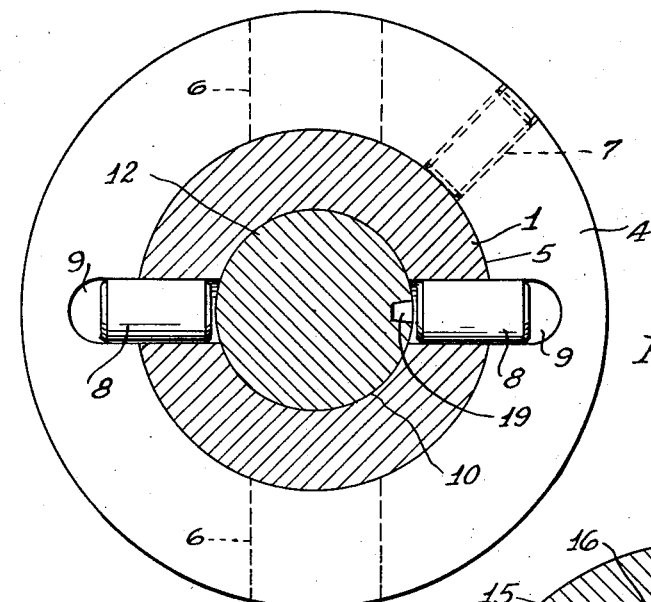
Figure 4:
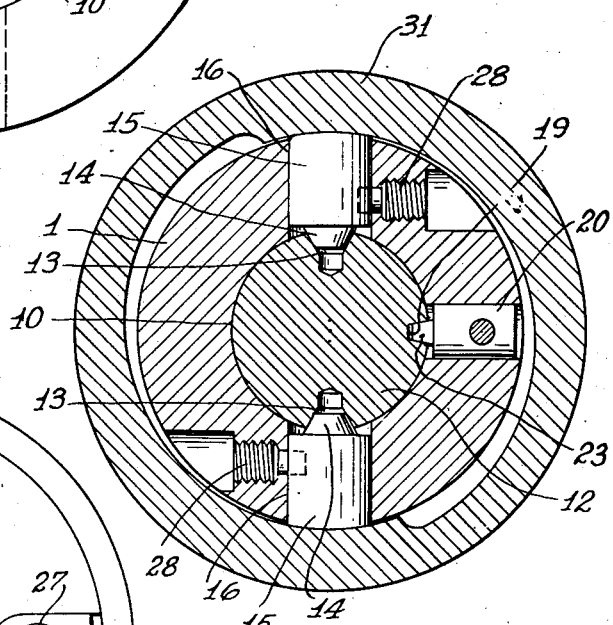
Figure 5:
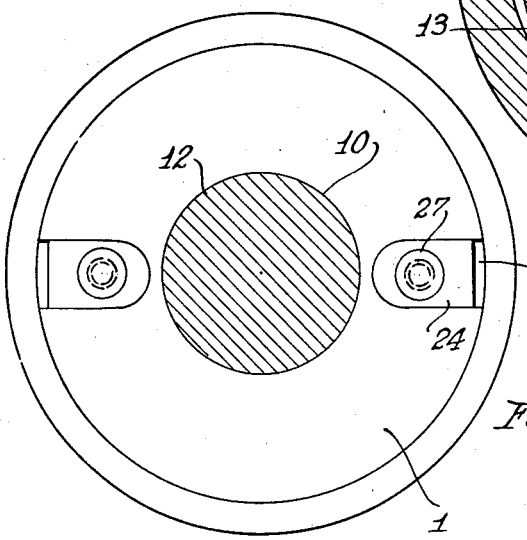

Fig. 3, 4 and 5 are sections taken respectively on the lines 3—3, 4—4 and 5—5 of Fig. 1.

More specifically, I designates the tool holder which comprises a body having a tapered shank 2 adapted to fit within a correspondingly tapered hole in the nose or flange of a milling machine spindle. The inner end of the holder has a tapped hole 3 for engagement by the end of a draw-bar (not shown) so that the tapered shank may be drawn into tight engagement with a spindle.

The spindle of a milling machine ordinarily has keys or driving dogs which are adapted to impart rotation to a tool arbor inserted therein. In order that the present holder may be driven by these dogs the present holder is provided with a driving collar 4 which comprises a ring which fits upon a cylindrical portion 5 of the holder. The collar 4 has diametrically opposed notches 6 (see Figs. 1 and 3) which are adapted to receive the keys or driving dogs on the spindle nose. The collar is held against accidental lengthwise displacement frictionally, by means of a set screw 7, and is driven rotatably by positive means comprising radially extending pins 8 pressed into holes in the holder and with their outer ends engaging in slots 9 in the collar.

The holder I has a central bore 10 for reception of an adapter II. The adapter II has an axially extending stud portion 12 which fits in the bore 10, and the outer end of the adapter which is broken away may be imagined as carrying a cutting tool.

The axially extending stud portion 12 has two diametrically opposed conical recesses 13 which are engaged by frusto-conical end portions 14 on the locking plungers 15. The locking plungers are disposed in cylindrical bores 16 which, as viewed in transverse cross section, are in radial planes, but which as viewed in longitudinal section, incline toward the shank 2 as they extend toward the axis of the holder. The reason for this is that as the plungers are moved inwardly into contact with the walls of the recesses 13 they tend to force the adapter II deeper into the bore 10. The flange 17 on the adapter II may be drawn tight against the end 18 of the holder, to definitely position the adapter lengthwise with respect to the holder.

To position the adapter rotatively the axially extending stud portion 12 is provided with a lengthwise extending groove 19 and a locating key is mounted in the holder for engagement with the walls of the groove. The key comprises a cylindrical body 20 mounted in a radially extending bore 21 in the holder I. The body 20 is retained in the bore 21 by a pin 22 which passes therethrough. The inner end of the body 20 has a wedge shaped projection 23 which engages in the slot 19.

To impart the necessary rotative forces from the holder I to the adapter II driving keys or dogs 24 are secured in key slots 25 in the end of the holder, and engage in recesses 26 in the flange 17 of the adapter. As may be seen in Fig. 2, the screw 27 which retains one of the keys 24 in place also is an integral part of the key retaining pin 22 so that by retracting the screw the pin may be withdrawn and the key 23 removed.

The locking plungers 15 are retained in place by dog-point screws 28 whose ends project into key slots 29 in the plungers. Springs 30 are also mounted in these key slots and they engage the ends of the screws and the ends of the key slots in such manner that they constantly tend to force the plungers outwardly. In the absence of inwardly directed pressure as hereinafter described, the springs 30 move the plungers outwardly so that the adapter may be withdrawn from the holder.

To move the plungers 15 inwardly, and to hold them in a position locking the adapter in the holder, a manual actuating ring 31 is provided. This ring has internal eccentric or cam-like surfaces which engage the outer ends of the plungers as is more clearly shown in Fig. 4. As the ring 31 is rotated clockwise as viewed in Fig. 4 the plungers 15 are forced inwardly, and as the ring is rotated counterclockwise the cam surfaces allow the plungers to move outwardly under pressure of the springs 30.

Although a specific embodiment of the invention has been illustrated and described it will be understood that various changes may be made within the scope of the appended claims without departing from the spirit of the invention, and such changes are contemplated.

What I claim is:

A tool holder comprising a member having an axially extending bore therein and a substantially radially extending bore extending inwardly and inclined rearwardly with respect to the holder, a locking plunger in said last named bore and having a conical point, said conical point being disposed at an angle with respect to the body portion of the plunger such that the axis of the conical point resides in a true radial position with respect to the holder, an adapter body received in said axial bore and having a radially disposed recess engaged by said conical point, yielding means urging said plunger outwardly, and manually operable cam means for moving said plunger inwardly into locking engagement with said recess.

CHARLES A. CHERRY.